Patented Feb. 11, 1947

2,415,763

UNITED STATES PATENT OFFICE 2,415,763

HEAT-RESISTING LAMINATED PLASTIC AND PRODUCTION THEREOF

Patrick P. Ryan, Trenton, N. J., assignor to St. Regis Paper Company, New York, N. Y., a corporation of New York No Drawing. Application January 30, 1946, Serial No. 644,432

8 Claims. (Cl. 154—138)

This invention pertains to resinous laminates of novel construction and to novel methods of producing the same, such that the resulting products are capable of withstanding relatively high temperatures, of the order of 300° to 350° F. or more, without blistering, delamination or other injury.

An object of the invention is to provide laminated products of the heat-resisting characteristics aforesaid, which are adapted for use in the production of composite sheet metal and laminated plastic articles, having a baked-on enameled, lacquered or equivalent finish, such as is employed in the fabrication of electric refrigerators, automobiles and the like.

This application is a continuation-in-part of my copending application Serial No. 380,997, filed February 28, 1941.

In the production of composite articles of the character aforesaid, it is highly desirable to finish the laminated plastic portion of the article with the same kind of baked-on enamel or equivalent coating, as is applied to the metal portions thereof, and to carry out this baking in a single operation on the completed composite structure employing the same oven and the same temperatures for both the laminated plastic and metal components.

For example, in the manufacture of electric refrigerators and the like, it is desirable to employ for the inner panel of the cabinet door, a laminated plastic construction, owing to its excellent heat-insulating properties. It is also desirable to employ for the exposed surface finish of this laminate, the same baked-on enamel finish that is applied to the metal portions of the cabinet and door, and it is further desirable to bake on this finish for the entire composite structure in a single baking operation. Prior to the present invention, however, it was impossible to do this, since the resinous laminates theretofore available were subject to blistering or delamination or both when subjected to the temperatures of 200° to 350° F. or more required for baking on the enamel finish. This blistering or delamination was due to the vaporization of residual volatile material trapped within the laminates as produced prior to my invention.

In accordance with my invention, I overcome the above-mentioned difficulties by recourse to a novel construction of the laminate, and a novel method of producing the same, characterized broadly as follows: I make the main body of the laminate, including one of the exposed surfaces, of a relatively low resin content, and hence of a relatively porous construction, such as to facilitate the escape of residual gases therethrough on heating. The opposite surface of the laminate, however, I construct of a surface layer which is relatively high in resin content and hence relatively impenetrable and impervious to the escape of gases during heating. It is to this latter surface that I apply the enamel coating, to be baked on after assembly of the laminate into a composite structure as aforesaid. Owing to this construction, such residual gases as may be driven off from the laminate during the baking operation will be forced to escape from the main body of the laminate through the non-exposed and relatively porous surface, and such that any slight defects as may be thereby produced on this surface will not be seen or impair the appearance of the composite structure after the baking operation. On the other hand, the exposed and enameled surface of the laminate, being of a construction which is relatively impenetrable and imporous to gases developed during the baking operation will resist the escape of such gases therethrough, and hence will not be marred or blistered by escaping gases.

More specifically, in accordance with the invention, I employ for the main body of the laminate, including one of the exposed surfaces, superposed layers of a relatively thick and porous, fibrous sheet material, such as kraft, alpha-cellulose, rag or sulphite paper, of for example about 10 to 11 mils in thickness, which I impregnate with a relatively low content of a thermosetting resin varnish, such, for example, as will produce, on subsequent oven-drying of the varnish, a final dry resin content equal to about 50 to 85% of the weight of the fibrous sheet material, or equal to about 35 to 45% of the total weight of the so-impregnated sheet material. For the opposite surface layer of the laminate, namely, that which is to be relatively impervious to the escape of gases on heating, I employ a surface layer of fibrous sheet material of the character aforesaid, which is relatively thin, i. e., about 3 to 4 mils in thickness, and which is rather heavily impregnated with the thermosetting resin varnish, and to such an extent, for example, as will result, on subsequent oven-drying, in a final dry resin content equal to about 120 to 185% of the weight of the paper, or equal to about 55 to 65% of the total weight of the so-impregnated material.

Moreover, and in addition to the novel constructional features of the laminate above noted, I employ a novel method for producing the laminate such as will assure the driving off of a maximum of the volatilizable constituents during the manufacture of the laminate, whereby, on subsequent baking on of the enamel coating, there is relatively little tendency for any further gases to be driven off. This I accomplish by the following process steps in course of manufacture of the laminate. Following the initial impregnation of the fibrous sheet material with the resin varnish as aforesaid, to obtain both the low resin content body sheet material and the high resin content surface sheet material, I subject the same to oven-drying at such temperature and for such time as not only to volatilize and drive off the solvent for the varnish, but, at the same time, to cure the resin to a state which approaches the end of the thermosetting condition as closely as possible, compatible with subsequent consolidation and integration of the superposed laminae on subsequent application of the usual combined heat and pressure conditions employed for such consolidation and conversion of the resin from the thermosetting to the thermoset, infusible and insoluble state. That is to say, in the oven-drying operation, I cure the resin to the condition of incipient transition into the thermoset condition. Or, stated somewhat differently, this drying and heating of the varnish is carried on to such an extent that the resin in the varnish will pass from the "A" stage substantially to the end of the "B" stage or to incipient transition into the "C" stage.

With the body and surface sheet material thus ovendried to the extent above stated, I superimpose sheets of the low resin content body material to the desired thickness, and place on one surface only thereof, a sheet of the high resin content surface material. This assembly is thereupon placed in a heated press, of usual construction, for purposes of consolidating the laminae into the finished laminate, while at the same time shaping the laminate into the desired final configuration, and concurrently transforming the resin content from the thermosetting stage, to the final thermoset, infusible and insoluble condition, or "C" stage. Pressure is thus applied to the assembly for but a brief interval initially, for example, not over one-third, and usually considerably less, of the total hot-pressing interval required for converting the resin substantially to the thermoset condition, whereupon the pressure is momentarily released to permit the escape of excess volatile material through the relatively porous or low resin content surface thereof. As noted below, this momentary release of the pressure to permit the escape of gases, is essential to the success of the process, and must be effected during an appropriate interval in the transition of the resin from the thermosetting condition into the final fully thermoset or "C" condition. Following this initial momentary release of the pressure, the pressure is resumed and continued uninterruptedly thereafter until the resin is completely cured, i. e., fully transformed to the thermoset or "C" condition, accompanied by consolidation of the laminae and shaping thereof as aforesaid, whereupon the pressure is released and the pressed article removed from the mold. When the method is properly carried out, as explained, there is no necessity for allowing the laminate to cool down in the mold, but it may be removed at once at the end of the pressing operation.

As above noted, it is essential to the success of the method that the above-mentioned initial, momentary release of the pressure be effected at the proper portion of the transition cycle of the resin from the thermosetting state into the completely thermoset or "C" state. If this release of pressure takes place too soon, the volatile materials will not be driven off to a sufficient extent, but excess volatile materials will remain trapped in the pressed article, and, when pressure is relieved at the end of the molding operation, this trapped volatile material will expand producing blistering of the article. On the other hand, if this initial pressure release is postponed too long, the volatile material trapped in the article will expand and separate the sheets of the laminate with a crackling sound that can be readily detected, and, when pressure is resumed, the sheets will not properly bond together because the resin has then advanced too far toward the fully thermoset or "C" condition. Therefore, the initial release of the mold pressure may be effected after the resin has been sufficiently transformed from the thermosetting or "B" state into the fully thermoset or "C" state that blistering will not occur, but, on the other hand, not so far advanced toward the fully thermoset or "C" condition as to prevent proper subsequent bonding of the laminae when pressure is resumed.

I have discovered that the appropriate interval for momentarily releasing the mold to expel gases, following initiation of the hot-pressing operation, is but a small fraction, not over one-third, and usually considerably less, of the total period of hot-pressing required for consolidating the laminate and completely curing the resin content thereof to the thermoset condition, a matter of seconds for the initial release, as compared to a matter of minutes for the total time of hot-pressing required. Depending on the type of resin employed, the temperature and pressure employed for hot-pressing, etc., the total hot-pressing time required for forming the finished laminate and completely curing the resin content thereof to the thermoset or "C" state may range, for extreme conditions, from about ¾ minute to about seven minutes. The corresponding appropriate interval for momentary release of the mold after pressure is initiated, and in order to expel accumulated gases, will range from about 5 to 20 seconds, increasing proportionately, within these limits, in accordance with the above-mentioned total hot-pressing time required to produce the finished laminate, that is to say, about 5 seconds for the initial release based on a total hot-pressing time of about ¾ minute to one minute, and about 20 seconds for the initial release based on a total hot-pressing time of about 7 minutes, and intermediate values in proportion. Furthermore, since an exothermic reaction occurs in the resin during the hot-pressing operation, this serves to maintain substantially uniform temperature throughout the laminate, more or less independently of its thickness, so that the above figures apply more or less independently of the thickness of the laminate. It will be evident from the above data that the initial pressure release ordinarily occurs at about ¹/₁₀ to ¹/₂₀ of the total hot-pressing interval required for converting the resin substantially to the fully thermoset condition.

For impregnating the fibrous sheet material aforesaid, I prefer to employ a resin varnish containing a quick-setting synthetic resin. Appropriate for this purpose are the phenol-aldehyde resins obtained by reaction of formaldehyde and its homologs, with phenol and its homologs, such as the cresols, xylenols, etc., or mixtures thereof, such as the various cresylic acid analyses. This synthetic resin is prepared in the "A" stage and made up into a suitable varnish by addition of appropriate, easily volatilized, organic solvents, such as ethyl or isopropyl alcohol, in the proportions of about 4 to 5 parts by weight of the resin to about 6 to 5 parts by weight of the solvent.

Although the varnish may be applied to the fibrous sheet material in any desired way, as by brushing, spraying, etc., I prefer to feed this material, for example, an absorbent type of kraft paper, in continuous strip form, progressively through a bath of the varnish, thereby thoroughly to impregnate and saturate the paper, the paper passing thence out of the bath between squeegee rolls which squeeze out the varnish to the desired extent, as noted below.

From the squeegee rolls, the so-impregnated paper is fed progressively through an oven wherein it is subjected to a high velocity, counterflow air current maintained at about 280 to 300° F. The rate of paper feed is so regulated that each section thereof remains in the oven and is subjected to the elevated temperature aforesaid, for an interval not only sufficient to volatilize and remove the solvent, but also to cure the resin to a state bordering upon the end of the thermosetting or "B" stage and incipient transition into the fully thermoset or "C" stage. The curing of the resin in the sheet material to the condition aforesaid can be precisely controlled in the process of oven-drying, since but a single thickness of the sheet material is being acted upon, and the rate of feed of the paper through the oven can be carefully controlled and adjusted. For the oven-drying conditions above stated, the resin will be cured to the proper extent, by so regulating the feed that each portion of the paper remains in the oven for about ¾ minute to about 4 minutes, and preferably about one minute to two minutes, it being understood that the paper enters the oven at substantially room temperature.

The so-treated paper is then cut into sheets of appropriate size to form the laminated structure, and, for commercial applications of the character aforesaid, the sheets are stacked to such thickness as to give a finished product about one-sixteenth to one-eighth inch in thickness, this ordinarily requiring about ten superposed sheets of the oven-dried, resin-impregnated material, for each one-sixteenth inch of the finished product. For this purpose, the lower resin content impregnated paper is employed for the main body portion surface of the laminate, while for the remaining surface sheet the higher resin content material is employed.

The stack is then placed in a hot-pressing apparatus of the usual construction, adapted to provide pressures of about 1000 to 1800 pounds per square inch, at temperatures of about 300 to 350° F., for purposes of hot pressing the stack to consolidate the laminae into the finished laminate, while imparting the desired final configuration thereto, and at the same time completely converting the resin from the thermosetting or "B" state to the fully thermoset or "C" state.

Pressure is applied by depressing the piston of the apparatus for only a brief period initially, a matter of about 5 to 20 seconds, for the resins and under the hot-pressing conditions above stated, whereupon the piston is momentarily elevated and pressure released to permit escape of volatilized material from the laminate. Thereupon the piston is again depressed and the pressure applied for the remaining interval required to convert the resin from the thermosetting to the thermoset condition. For the conditions of temperature and pressure above stated, the total hot-pressing interval thus required to convert the laminate fully to the thermoset condition, will vary from about 1 to 7 minutes, depending on the particular temperature and type of resin employed. The higher the temperature at which the pressing is carried out in the above-mentioned range of about 300 to 350° F., the shorter the interval for initial pressure release and total time required within the limits above stated, and vice versa. For still higher temperatures of pressing, the curing time will be proportionately less, and the reverse.

The surface sheet, having a higher percentage of resin therein, forms a good base for the final enamel or other siccative coat, but, as stated, is relatively impervious to gases. If, therefore, such a surface sheet were applied on both sides of the laminate, there would be difficulty in releasing the entrapped gases during the initial momentary pressure release. Also, in the body of the laminate, there must be sufficient pores to allow the escape of entrapped gases in order to avoid blistering during this operation. For that reason, the body of the pressed laminate and at least one side thereof must be of material in which the pores are not completely filled with resin, in accordance with the laminate construction and preparation thereof as above described.

After a pressed laminate has been formed in the manner described, an enamel or other siccative coat may be applied to the surface layer thereof having the higher resin content, as by spraying, brushing, etc., and the coated article may be passed through the usual baking oven without injury. However, it is preferable to confine the final baking temperature to a temperature not materially exceeding that at which the article is cured in the hot press. For best results, it is preferred to cure the article at a temperature at least slightly exceeding that at which it is to be subsequently baked.

The enamel coating may appropriately be made of a thermosetting melamine resin, alone or modified with alkyd resins, and embodying suitable pigments, such as zinc sulphide, titanium dioxide, etc. Such an enamel coating, when sprayed onto the thermoset phenolic resin laminate and baked to convert the coating resin to the thermoset state, will form an excellent and integral bond with the laminate.

The following examples serve as specific illustrations of the process and resulting product comprising the present invention:

*Example I*

A resin varnish for impregnating the fibrous sheet material is made up as follows: 10 parts by weight of phenol, 10 parts by weight of aqueous formaldehyde solution (i. e., 37.5% formaldehyde by weight of the solution, viz., commercial formalin), and 0.1 part by weight of caustic soda (dissolved in sufficient water to form an aqueous solution), are charged into a steam-jacketed kettle, fitted with a water-jacketed condenser, and arranged for refluxing at substantially atmospheric pressure. Steam is introduced into the kettle jacket, at 50 to 75 pounds pressure, and the mixture refluxed for about thirty minutes. Thereupon, the steam is shut off, cold water circulated through the jacket, and vacuum applied to the kettle until water is removed by distillation from the batch, to the extent of about 2.5 parts of water by weight of the batch. The resin as thus prepared is thereupon converted into a varnish, suitable for impregnating purposes, by dissolving the same in about 2.5 parts by weight of isopropyl alcohol (91%).

For preparing the resin-impregnated fibrous sheet material of lower resin content to be employed in the body of the laminate, an absorbent type of kraft paper of about 10 to 11 mils in thickness, in continuous strip form, is fed through a bath of the aforesaid varnish thoroughly to impregnate the same therewith, the paper being fed out of the bath between squeegee rolls to remove the excess varnish to the extent explained below, and the paper fed thence through an oven provided with a high velocity counterflow air current maintained at about 280 to 300° F., for drying and curing the resin, the paper remaining in the oven for this purpose for a period of about one minute, the resin content being initially so controlled by the squeegee rolls, that the resulting dry resin content after the aforesaid oven-drying, is about 35 to 45% by weight of the resulting impregnated product. For the laminate surface sheet of higher resin content, a similar type of kraft paper of about 3½ mils thickness is similarly treated, being passed through the oven dryer at such rate that each section of the paper remains in the oven for about two minutes, and the resin varnish content being initially so regulated by the squeegee rolls, as to result in a dry resin content after oven-drying of about 55 to 65% of the total weight of the resulting resin-impregnated paper.

The paper is thereupon cut and stacked to the extent of 10 sheets of the lower resin content body material, with one upper surface sheet of the higher resin content surface material, and the assembly placed in a hot press adapted to provide a pressure of 1500 pounds per square inch and a temperature of 330° F., and pressure applied to consolidate the laminate. Ten seconds after the hot-pressing operation is initiated, the mold is momentarily released to permit the escape of accumulated gases, whereupon the mold is again closed for a total period of 4 minutes. The resulting laminate will have a thickness of $\frac{1}{16}$ inch.

An enamel coating material which is essentially an oil modified glyceryl phthalate synthetic resin pigmented with titanium dioxide is then sprayed, at room temperature, onto the laminate surface of higher resin content, and the laminate formed into a composite article of the character aforesaid, whereupon the enamel coating of the entire article is baked on at a temperature of 300° F., for a period of about 30 minutes, during which operation the resin of the coating material is converted from the thermosetting to the thermoset condition, and thus integrally bonded to the laminate. For this purpose, an oven illuminated with infra red lamps, etc., may be employed.

Example II

A resin varnish is made up in the same manner as set forth in Example I, and the same procedure followed as set forth therein for preparing the resin-impregnated paper employed in the body portion of the laminate and also that employed for the surface layer.

The so-impregnated paper is thereupon cut and stacked to the extent of ten sheets of the low resin content body material, with one upper surface sheet of the higher resin content surface material, and the assembly placed in a hot press adapted to provide a pressure of about 1500 pounds per square inch, at a temperature of about 300° F., and pressure applied to consolidate the laminate. Twenty seconds after the hot-pressing operation is initiated, the mold is momentarily released to permit the escape of accumulated gases, whereupon the mold is again closed for a total hot-pressing period of seven minutes. The resulting laminate will have a thickness of $\frac{1}{16}$ inch.

An enamel coating is thereupon applied to the laminate surface of higher resin content, and baked on in accordance with the procedure described in Example I.

I claim:

1. A relatively hard, rigid and non-deformable resinous laminate, capable of withstanding temperatures in excess of 300° F. and of receiving a baked-on enamel coating without blistering or delamination, said laminate comprising the heat and pressure reaction product of a multiplicity of superimposed, preformed and thermosetting resin-impregnated sheets of fibrous material, said resin being reacted to the thermoset condition in said laminate and integrally uniting said sheets of fibrous material therein, one surface sheet of said laminate being relatively high in resin content and providing a relatively smooth, hard and imporous exposed surface adapted for reception of said baked-on enamel coating, the remainder of said laminate, including the body and opposite surface sheet thereof, being relatively low in resin content and sufficiently porous to permit the escape therethrough of evolved gases on heating.

2. A relatively hard, rigid and non-deformable resinous laminate capable of withstanding temperatures in excess of 300° F. without blistering or delamination, said laminate comprising the heat and pressure reaction product of a multiplicity of superimposed, preformed and thermosetting resin-impregnated sheets of fibrous material, said resin being reacted to the thermoset condition in said laminate and integrally uniting said sheets of fibrous material therein, one surface sheet of said laminate being relatively high in resin content and providing a relatively smooth, hard, and imporous exposed surface adapted for reception of said baked-on enamel coating, said surface embodying a baked-on enamel coating, the remainder of said laminate, including the body and opposite surface sheet thereof, being relatively low in resin content and sufficiently porous to permit the escape therethrough of residual gases evolved during the baking-on of said enamel coating.

3. A relatively hard, rigid and non-deformable resinous laminate, capable of withstanding temperatures in excess of 300° F. and of receiving a baked-on enamel coating without blistering or delamination, said laminate comprising the heat and pressure reaction product of a multiplicity of superimposed, preformed and thermosetting resin-impregnated sheets of fibrous material, said resin being reacted to the thermoset condition in said laminate and integrally uniting said sheets of fibrous material therin, one surface sheet of said laminate being relatively high in resin content, substantially exceeding the weight of said fibrous sheet material therein, and providing a relatively smooth, hard and imporous exposed surface adapted for reception of said baked-on enamel coating, the remainder of said laminate, including the body and opposite surface sheet thereof, being relatively low in resin content, substantially less than the weight of said fibrous sheet material therein, and being sufficiently porous to permit the escape therethrough of residual gases evolved on heating said laminate.

4. A relatively hard, rigid and non-deformable resinous laminate, capable of withstanding temperatures in excess of 300° F. and of receiving a baked-on enamel coating without blistering or delamination, said laminate comprising the heat and pressure reaction product of a multiplicity of superimposed, preformed and thermosetting resin-impregnated sheets of fibrous material, said resin being reacted to the thermoset condition in said laminate and integrally uniting said sheets of fibrous material therein, one surface sheet of said laminate being relatively high in resin content and providing a relatively smooth, hard and imporous exposed surface adapted for reception of said baked-on enamel coating, the resin content of said surface sheet comprising about 120 to 185% of the weight of the fibrous sheet material therein, the remaining portion of said laminate, including the body and opposite surface sheet thereof, being relatively low in resin content and sufficiently porous to permit the escape therethrough of residual gases evolved on heating, the resin content of said remaining portion comprising about 50 to 85% of the weight of the fibrous sheet material therein.

5. A relatively hard, rigid and non-deformable resinous laminate, capable of withstanding temperatures in excess of 300° F. and of receiving a baked-on enamel coating without blistering or delamination, said laminate comprising the heat and pressure reaction product of a multiplicity of superimposed, preformed and thermosetting resin impregnated sheets of cellulosic fibrous material, said resin being selected from the group consisting principally of the thermosetting phenolic and urea resins, and being reacted to the thermoset condition in said laminate, and integrally uniting said sheets of fibrous material therein, one surface sheet of said laminate being relatively high in resin content and providing a relatively smooth, hard and imporous exposed surface adapted for reception of said baked-on enamel coating, the remainder of said laminate, including the body and opposite surface sheet thereof, being relatively low in resin content, and sufficiently porous to permit the escape therethrough of residual gases evolved on heating.

6. The method of producing a resinous laminate, which is capable of withstanding temperatures in excess of 300° F. and of receiving a baked-on enamel coating without blistering or delamination, said method comprising: impregnating fibrous sheet material with a thermosetting synthetic resin to a relatively high resin content and such as to produce in the finished laminate a relatively smooth, hard and imporous layer; impregnating other fibrous sheet material with a thermosetting resin to a relatively low resin content, such as to produce in the finished laminate a sufficiently porous layer to permit the escape therethrough of gases evolved on heating; forming a stack comprising superimposed layers of said relatively porous, low resin content sheet material, on which is superimposed on one side only of the stack, a surface sheet of said relatively imporous, high resin content sheet material; subjecting the stacked assembly to combined heat and pressure in a heated press until the resin content thereof is in the transition stage between the thermosetting and the thermoset conditions; thereupon relieving the pressure to permit evolved gases to escape through said relatively porous layers; and thereupon resuming the pressure until said resin has been cured to the thermoset condition and said assembly consolidated into a unitary laminate, one surface of which is relatively hard, smooth, and imporous, and adapted for reception of said baked-on enamel coating, and the remainder of which, including the body and opposite surface, is sufficiently porous to permit the escape of residual gases evolved, whereby said laminate may be removed from the press while hot without injury.

7. The method of producing a resinous laminate, which is capable of withstanding temperatures in excess of 300° F. and of receiving a baked-on enamel coating without blistering or delamination, said method comprising: impregnating fibrous sheet material with a thermosetting resin varnish adjusted to produce a resulting resin-impregnated sheet having a relatively high resin content, and such as to produce in the finished laminate a relatively smooth, hard and imporous layer; impregnating other fibrous sheet material with a thermosetting resin varnish adjusted to produce a resulting resin-impregnated sheet having a relatively low resin content, and such as to produce in the finished laminate a sufficiently porous layer to permit the escape therethrough of gases evolved on heating; drying the so-impregnated sheet materials at elevated temperature, to remove volatile constituents and to cure the resin thereof substantially to the end of the thermosetting stage; forming a stack comprising superimposed layers of said relatively porous, low resin content sheet material, on which is superimposed, on one side only of the stack, a surface sheet of said relatively imporous, high resin content sheet material; subjecting the stacked assembly to combined heat and pressure in a heated press until the resin content thereof is in the transition stage between the thermosetting and the thermoset conditions; thereupon relieving the pressure to permit evolved gases to escape through said relatively porous layers; and thereupon resuming the pressure until said resin has been cured to the thermoset condition and said assembly consolidated into a unitary laminate, one surface of which is relatively smooth, hard and imporous and adapted for reception of said baked-on enamel coating, and the remainder of which, including the body and opposite surface, is sufficiently porous to permit the escape of residual gases evolved, whereby said laminate may be removed from the press while hot, without injury.

8. The method of producing a hot pressed, resinous laminate, which is capable of withstanding temperatures in excess of 300° F. without blistering or delamination, and which may thereby be removed from the press while hot, without injury, said method comprising: impregnating a cellulosic, fibrous sheet material with a thermosetting resin varnish selected principally from the group comprising phenolic and urea resins, said impregnation being adjusted to produce a resulting resin impregnated sheet, the resin content of which is relatively high and constitutes about 120 to 185% of the weight of said sheet material on subsequent drying; impregnating other fibrous sheet material with said resin varnish, adjusted to produce a resulting resin impregnated sheet, the resin content of which is relatively low and constitutes about 50 to 85% of the weight of said sheet material on subsequent drying; drying the so impregnated sheet materials at elevated temperature, to remove volatile constituents and to cure the resin contents thereof substantially to the end of the thermosetting stage; forming a stack comprising superimposed layers of said relatively low resin content sheet material on which is superimposed, on one side only of the stack, a surface sheet of said relatively high resin content sheet material; subjecting the stacked assembly to combined heat and pressure in a heated press at a temperature upwards of about 300° F. and at a pressure upwards of about 1000 pounds per square inch, for a period of about five to twenty seconds; thereupon momentarily relieving the pressure to permit escape of evolved gases; thereupon resuming the pressure for a total interval of about one to seven minutes, until said resin has been cured to the thermoset condition and said assembly consolidated into a unitary laminate, one surface of which is relatively smooth, hard and imporous, and the remainder of which, including the body portion and the opposite surface, is relatively porous, whereby said laminate may be removed from the press while hot, without injury.

PATRICK P. RYAN.

REFERENCES CITED

The following references are of record in the file of this patent:

UNITED STATES PATENTS

| Number | Name | Date |
|---|---|---|
| 2,077,017 | Schacht | Apr. 13, 1937 |
| 1,731,240 | Apfelbaum | Oct. 15, 1929 |